(12) United States Patent
Prociw et al.

(10) Patent No.: US 7,497,012 B2
(45) Date of Patent: Mar. 3, 2009

(54) GAS TURBINE FUEL NOZZLE MANUFACTURING

(75) Inventors: Lev Alexander Prociw, Elmira (CA);
Harris Shafique, Longueuil (CA);
Lafleche Gagnon, Ste-Julie (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 805 days.

(21) Appl. No.: 11/016,831

(22) Filed: Dec. 21, 2004

(65) Prior Publication Data
US 2006/0130328 A1    Jun. 22, 2006

(51) Int. Cl.
*B21D 51/16* (2006.01)
*B21K 25/00* (2006.01)
*F02C 3/14* (2006.01)
*F02C 1/00* (2006.01)

(52) U.S. Cl. .............. 29/889.2; 29/890.09; 29/890.128; 29/890.142; 60/39.34; 60/740; 60/742

(58) Field of Classification Search .............. 29/889.22, 29/559, 418, 890.142, 889.2, 890.09, 890.128; 60/39.34, 740, 742, 800
See application file for complete search history.

(56) References Cited

U.S. PATENT DOCUMENTS

| 3,889,356 | A |   | 6/1975  | Cleaver et al. |
|-----------|---|---|---------|----------------|
| 4,151,765 | A | * | 5/1979  | Sevastakis ................... 82/1.11 |
| 4,494,297 | A | * | 1/1985  | Larsson ..................... 29/527.6 |
| 4,559,852 | A | * | 12/1985 | Atkinson .................... 76/108.2 |
| 4,637,620 | A | * | 1/1987  | Graham et al. .............. 279/127 |
| 4,899,712 | A | * | 2/1990  | De Bruyn et al. ........... 123/468 |
| 5,556,649 | A | * | 9/1996  | Sumioka et al. ............. 425/215 |
| 5,604,969 | A | * | 2/1997  | Coop .......................... 29/418 |
| 5,819,593 | A | * | 10/1998 | Rixon et al. .................. 74/514 |
| 6,088,903 | A |   | 7/2000  | Matsuo |
| 6,141,968 | A | * | 11/2000 | Gates et al. ................... 60/740 |
| 6,272,748 | B1| * | 8/2001  | Smyth .................... 29/894.322 |
| 6,598,296 | B2| * | 7/2003  | Smyth .................... 29/894.322 |

* cited by examiner

*Primary Examiner*—David P Bryant
*Assistant Examiner*—Alexander P Taousakis
(74) *Attorney, Agent, or Firm*—Ogilvy Renault LLP

(57) ABSTRACT

A method and a pre-shaped workpiece for making at least a portion of a gas turbine fuel nozzle are disclosed having opposed gripping tabs which can be secured to machine tool holders during manufacturing by a machine tool.

7 Claims, 4 Drawing Sheets

GAS TURBINE FUEL NOZZLE MANUFACTURING

TECHNICAL FIELD

The invention relates generally to fuel nozzles for gas turbine engines and, more particularly, to improved methods of making the same.

BACKGROUND OF THE ART

Conventional fuel nozzles are manufactured in multiple pieces produced from castings that have an overall diameter at least equal to the largest diameter of the parts. Consequently, a large quantity of material is removed, especially if the section with the largest diameter is only a small fraction of the parts. The time and cost for manufacturing parts are thereby increased. Moreover, nozzle parts need to be re-positioned in the machine tool for various operations, which increases the difficulties of manufacturing the fuel nozzles since each repositioning requires that the part be precisely realigned with reference to the machine tool in order to keep tolerances within the desired level.

There is a need to provide improved manufacturing methods which can greatly simplify the manufacturing of gas turbine fuel nozzles, thereby reducing the manufacturing time and cost.

SUMMARY OF THE INVENTION

In one aspect, the present invention provides a method of making at least a portion of a gas turbine fuel nozzle, the method comprising: providing a pre-shaped workpiece having two gripping tabs projecting therefrom adjacent opposite ends, the gripping tabs being coaxial with one another; securing the gripping tabs to machine tool holders; rotating the workpiece; machining the workpiece into a near-final form; and removing the gripping tabs from the workpiece.

In a second aspect, the present invention provides a method of making a gas turbine fuel nozzle, the method comprising: providing a pre-shaped workpiece having two opposite gripping tabs thereon, the gripping tabs being aligned on a main axis of the workpiece; inserting the gripping tabs into holders of a machine tool; rotating the workpiece; machining the workpiece with the machine tool into a fuel nozzle in a near-final form; and removing the gripping tabs from the fuel nozzle using the machine tool.

In a third aspect, the present invention provides a pre-shaped workpiece for use in a machine tool to manufacture at least a portion of a gas turbine fuel nozzle, the workpiece comprising two gripping tabs to provide a grip for the machine tool, the gripping tabs being configured and disposed to be removed from the item in a near-final form and being in registry with a main axis of the item.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION

Figure 1:
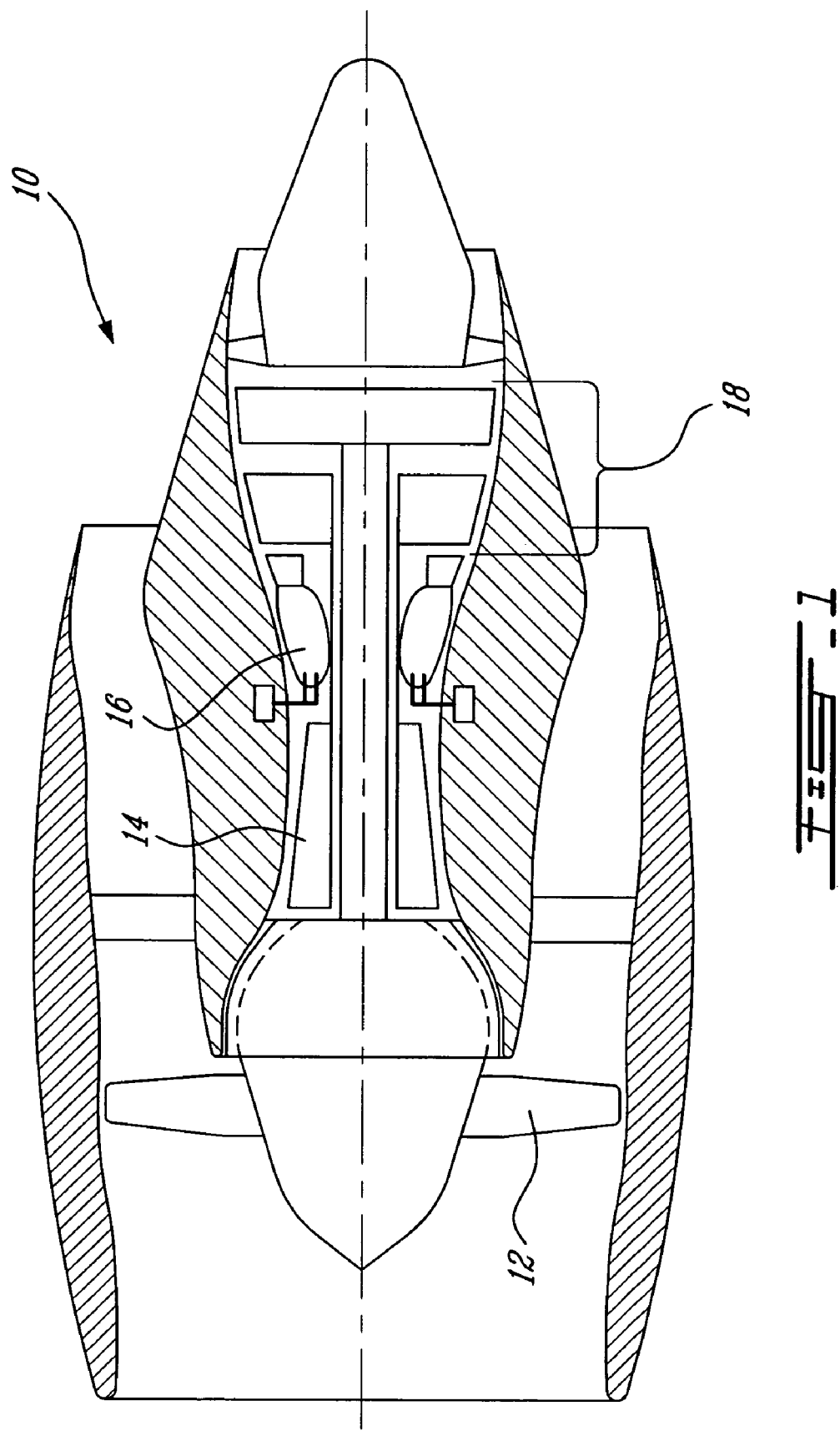
FIG. 1 shows a generic gas turbine engine to illustrate an example of a general environment in which the invention can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. This figure illustrates an example of the environment in which the present invention can be used.

Figure 2:
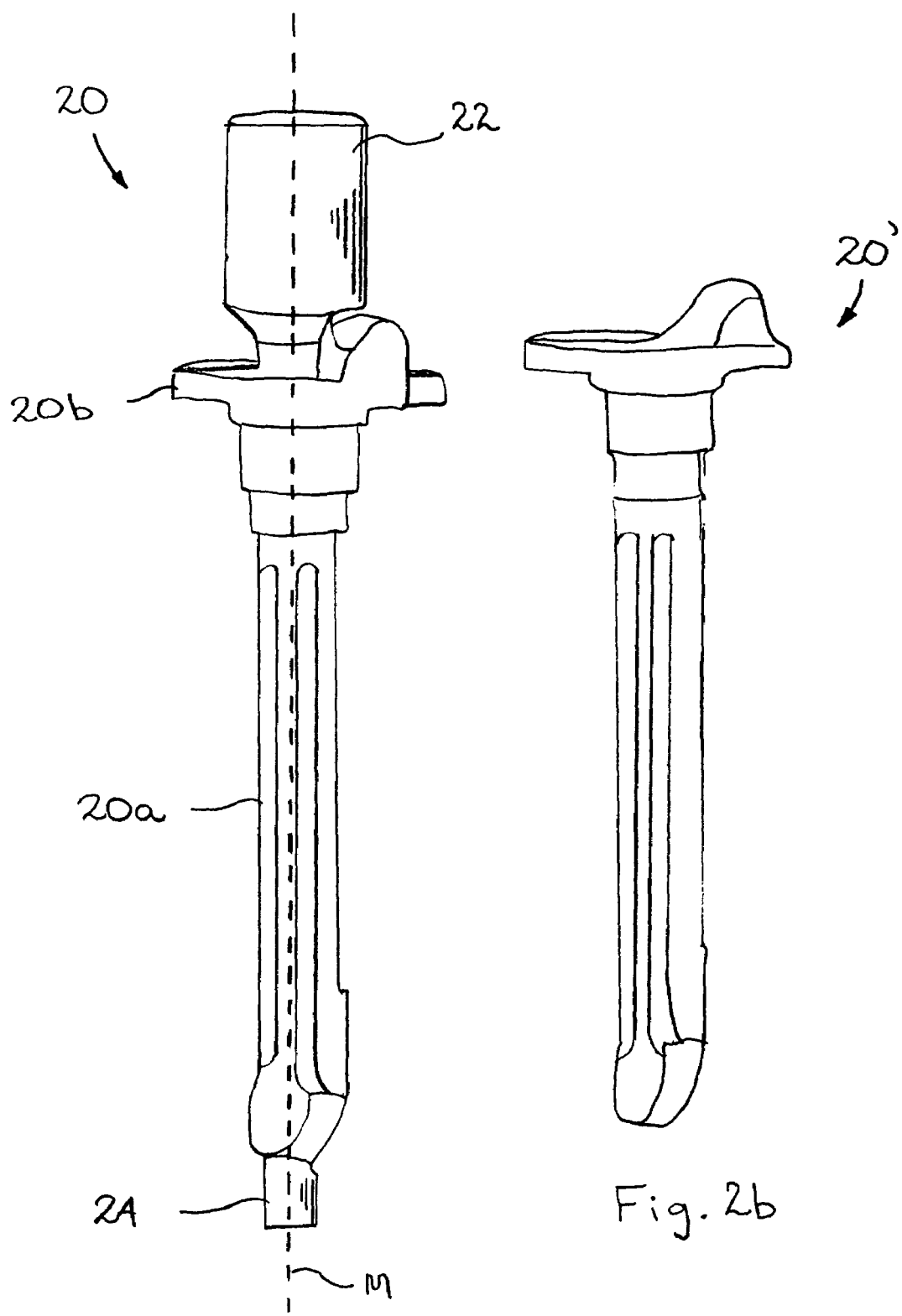
FIGS. 2a and 2b are perspective views of an example of a fuel nozzle made in accordance with the present invention, FIG. 2a showing the fuel nozzle before being machined by the machine tool and FIG. 2b showing the fuel nozzle at the end of the manufacturing process.

FIG. 2a shows a workpiece 20 for manufacturing one possible embodiment of gas turbine fuel nozzle. It comprises a stem portion 20a and a flange portion 20b. This workpiece 20 is pre-shaped so as to minimize the quantity of material to be removed. It is preferably obtained by casting, forging, stamping or a combination thereof.

Initially, the workpiece 20 includes two opposite gripping tabs 22, 24. The tabs 22, 24 are integrally connected to the workpiece 20. These gripping tabs 22, 24 are preferably cylindrical, although other shapes and configurations are possible. The two gripping tabs 22, 24 are in registry with the main axis M of the workpiece 20, which means that the center of the gripping tabs 22, 24 are coaxially aligned with the main axis M. However, it should be noted that the main axis M is not necessarily the central axis of the workpiece 20 although this is preferred.

The gripping tabs 22, 24 are used as connection points for machine tool holders. This allows holding the workpiece 20 by simply securing the gripping tabs 22, 24 to the machine tool holders. Since the holders are coaxial, the piece may be rotated during machining, such as turning between centres, etc.

FIG. 2b illustrates the resulting fuel nozzle 20' at the end of the manufacturing process. One can see that the gripping tabs have been removed.

Figure 3:
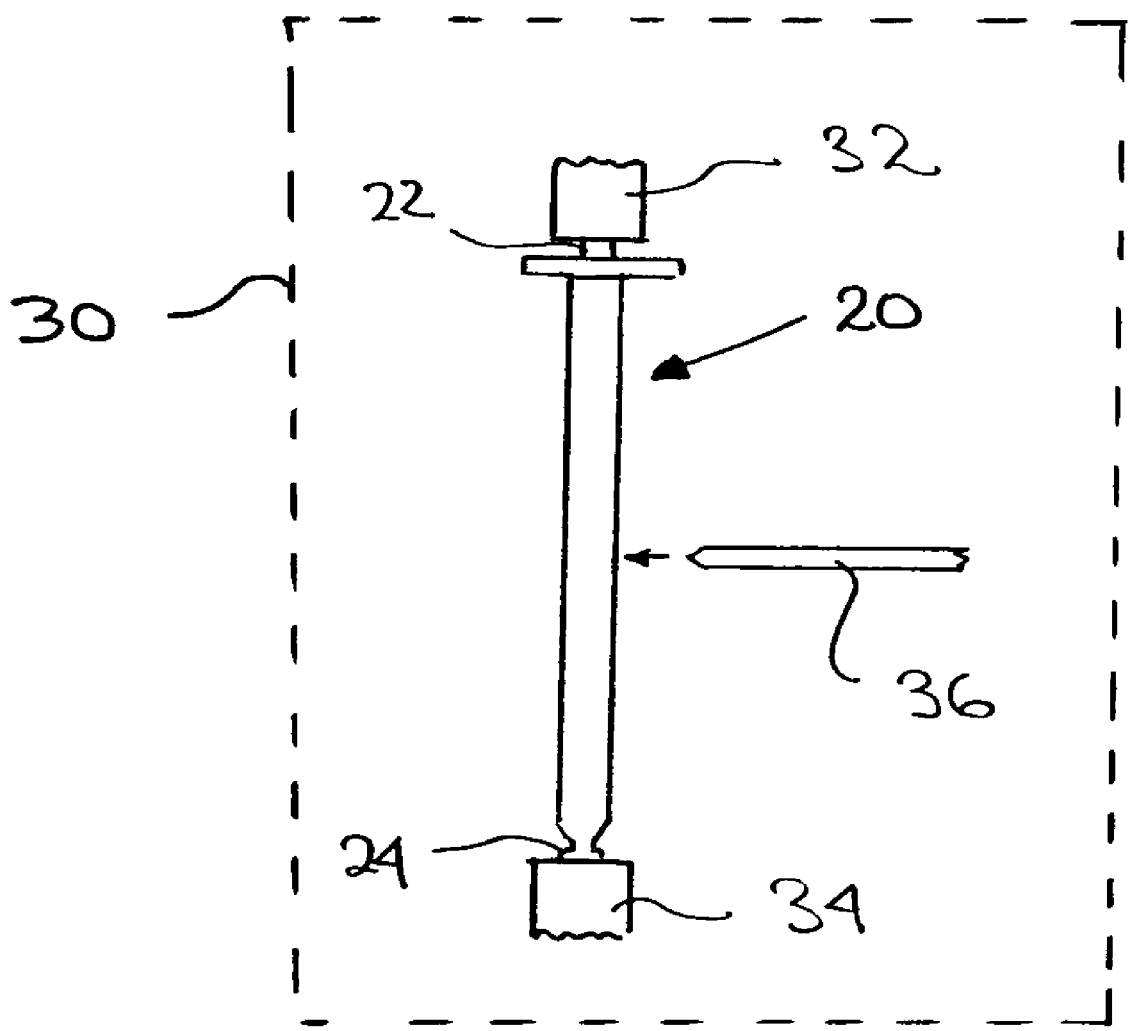
FIG. 3 is a schematic view of a workpiece being machined in a machine tool.

FIG. 3 schematically illustrates a machine tool 30, such as a mill turn machine tool, in which is provided a pair of holders 32, 34. The holders 32, 34 in the machine tool 30 are preferably mounted on moveable carriers (not shown), including co-rotating collets, so that machining can be undertaken in accordance with many possible axes. A tool 36, either driven in rotation or only passive, is positioned against the surface of the workpiece 20 to machine its outer surfaces. The tool 36 can also take advantage of the fact that the whole workpiece 20 can be rotated around the main axis M or be otherwise moved during a manufacturing step. More than one tool 36 is generally required to complete the manufacturing. Yet, the manufacturing is done on at least a portion of the workpiece 20, although all surfaces are preferably machined-before the fuel nozzle 20' is finished. It is thus possible to design a fuel nozzle 20' with one or more sections that are already completed when the raw workpiece 20 is produced.

Once the workpiece 20 is in a near final form, such as near the end of the machining process, the gripping tabs 22, 24 can be removed from the workpiece 20 by cutting them or otherwise removing them, preferably while they are still within at least one of the machine tool holders 32, 34. The advantage of using this process is that the manipulation of the workpiece 20 is minimized. Ideally, the complete manufacturing process could be done without having to remove the workpiece 20 from any of the machine tool holders 32, 34 until the end. This greatly simplifies handling.

Figures 4A, 4B:
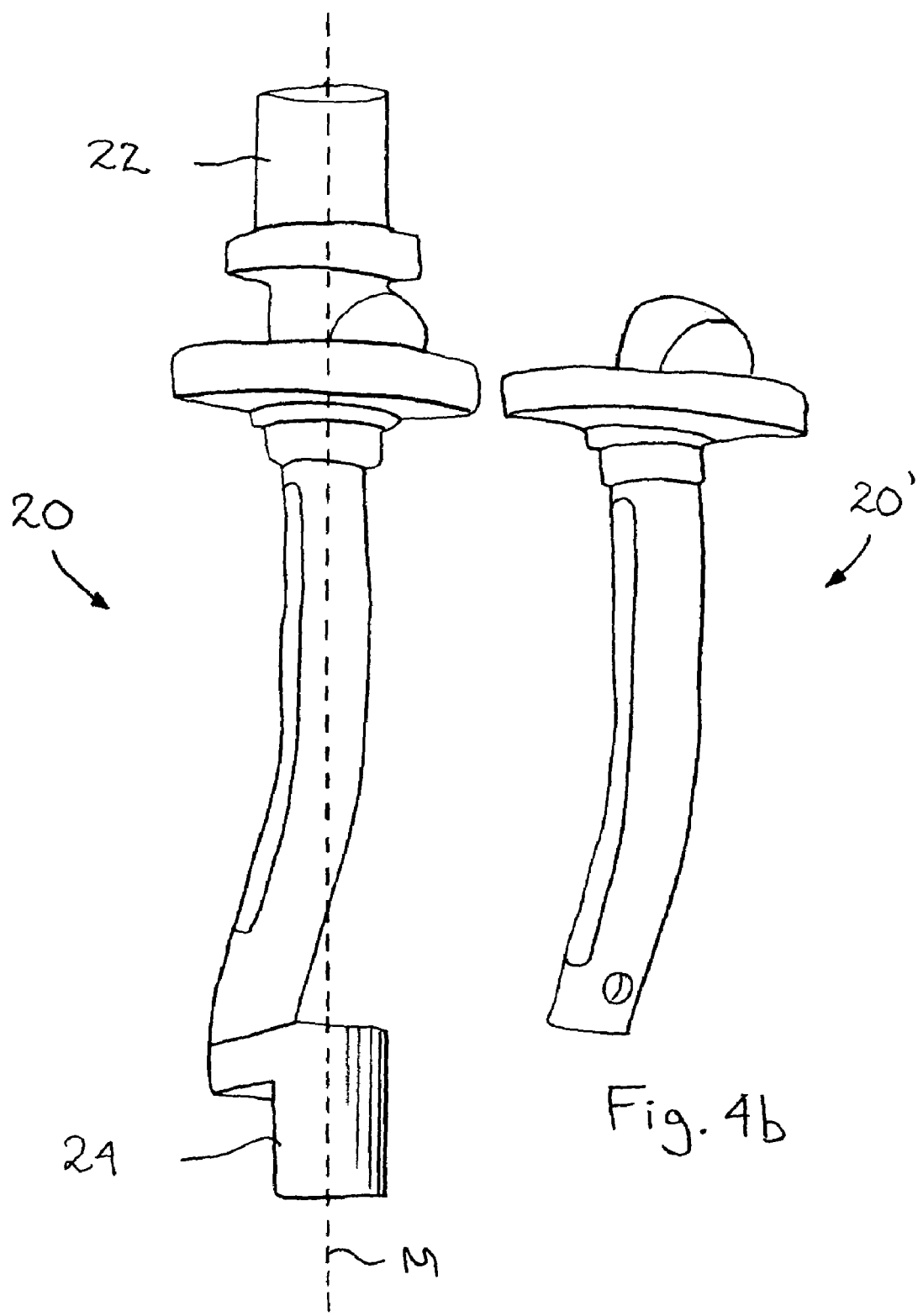
FIGS. 4a and 4b are views similar to FIGS. 2a and 2b, showing a fuel nozzle in accordance with another possible embodiment.

FIGS. 4a and 4b are views similar to FIGS. 2a and 2b, showing another example of fuel nozzle 20' that can be manufactured from a pre-shaped workpiece 20 using the present invention. As can be seen, the workpiece or nozzle needs not be symmetrical about axis M.

As can be appreciated, using a workpiece 20 in the making of a gas turbine fuel nozzle 20' allows having a single piece with fewer braze joints. The integrated one-piece member thus has fewer parts. This allows designing a part with only a minimum of material being removed during the manufacturing process and using the same machine tool 30. Overall, the cost for making a fuel nozzle using the present invention is lower than using conventional techniques and the manufacturing time is lower. Fuel channels may be provided in accordance with U.S. Pat. No. 6,141,968, or any other suitable matter.

The above description is meant to be exemplary only, and one skilled in the art will recognize that changes may be made to the embodiments described without department from the scope of the invention disclosed. For example, the pre-shaped workpiece can be made using other techniques than casting, forging or stamping. The gripping tabs are not necessarily cylindrical. These tabs can be removed from the workpiece, at any stage and using any method. Any number of gripping tabs may be used. Still other modifications which fall within the scope of the present invention will be apparent to those skilled in the art, in light of a review of this disclosure, and such modifications are intended to fall within the appended claims.

What is claimed is:

1. A method of making at least a portion of a gas turbine fuel nozzle, the method comprising:
providing a pre-shaped workpiece, the workpiece having a fuel nozzle stem portion integrated with a fuel nozzle flange portion, the workpiece further having two gripping tabs projecting therefrom adjacent opposite ends, the gripping tabs being coaxial with one another;
securing the gripping tabs to machine tool holders;
rotating the workpiece;
machining the workpiece into a near-final form; and
removing the gripping tabs from the workpiece.

2. The method as defined in claim 1, wherein the pre-shaped workpiece is made by one among the group consisting of casting, forging, stamping or a combination thereof.

3. The method as defined in claim 1, wherein the pre-shaped workpiece flange portion and stem portion are cast together as a single casting.

4. The method as defined in claim 1, wherein the machine tool holders are co-rotating collets adapted to rotate the workpiece in the machine tool around its main axis.

5. The method as defined in claim 1, wherein the gripping tabs are removed from the workpiece while the workpiece is still held by at least one of the machine tool holders.

6. The method of claim 1 wherein the gripping tabs are coaxial about a workpiece axis, and wherein the workpiece is non-axisymmetric about said axis.

7. A method of making a gas turbine fuel nozzle, the method comprising:
providing a non-axisymmetric fuel nozzle stem workpiece having two opposite gripping tabs thereon, the gripping tabs being aligned on a main axis of the workpiece;
inserting the gripping tabs into holders of a machine tool;
rotating the workpiece;
machining the workpiece with the machine tool into a fuel nozzle in a near-final form; and
removing the gripping tabs from the fuel nozzle using the machine tool.

* * * * *